United States Patent
Arai et al.

(10) Patent No.: US 7,894,029 B2
(45) Date of Patent: Feb. 22, 2011

(54) APPARATUS FOR OPTICALLY ARRANGING SURFACE OF ALIGNMENT FILM AND METHOD FOR MANUFACTURING LIQUID CRYSTAL DISPLAY DEVICE USING THE SAME

(75) Inventors: Takeshi Arai, Yokohama (JP); Yasuhiro Yoshitake, Yokohama (JP); Shigeru Matsuyama, Mobara (JP)

(73) Assignee: Hitachi Displays, Ltd., Chiba-Ken (JP)

( * ) Notice: Subject to any disclaimer, the term of this patent is extended or adjusted under 35 U.S.C. 154(b) by 649 days.

(21) Appl. No.: 11/103,491

(22) Filed: Apr. 12, 2005

(65) Prior Publication Data

US 2005/0225695 A1  Oct. 13, 2005

(30) Foreign Application Priority Data

Apr. 12, 2004  (JP)  ............................ 2004-116518

(51) Int. Cl.
 *G02F 1/1337* (2006.01)
(52) U.S. Cl. ...................... 349/124; 349/123; 349/187
(58) Field of Classification Search ......... 349/123–124, 349/187
 See application file for complete search history.

(56) References Cited

U.S. PATENT DOCUMENTS

| | | | |
|---|---|---|---|
| 4,345,249 A | | 8/1982 | Togashi |
| 6,532,047 B1 * | | 3/2003 | Suzuki et al. ................. 349/96 |
| 2004/0179158 A1 * | | 9/2004 | Silverstein et al. .......... 349/117 |
| 2005/0134777 A1 * | | 6/2005 | Lee et al. .................... 349/123 |
| 2005/0259203 A1 * | | 11/2005 | Kimura et al. ............... 349/124 |

FOREIGN PATENT DOCUMENTS

| | | |
|---|---|---|
| JP | 63-21907 | 5/1988 |
| JP | 10-332932 | 12/1988 |
| JP | 08-095045 | 4/1996 |
| JP | 10-090684 | 4/1998 |
| JP | 10-161126 | 6/1998 |
| JP | 2001-117101 | 4/2001 |

OTHER PUBLICATIONS

Japanese Office Action, dated Feb. 12, 2008, issued in corresponding Japanese Patent Application No. 2004-116518.

* cited by examiner

*Primary Examiner*—David Nelms
*Assistant Examiner*—Nathanael R Briggs
(74) *Attorney, Agent, or Firm*—Antonelli, Terry, Stout & Kraus, LLP.

(57) ABSTRACT

Work is irradiated with polarized light generated by configuring in such a manner as to have a polarizer using a grating that separates polarized light from non-polarized light, a lamp and a condenser mirror that allow light to fall on the polarizer, a collimator lens that converts the incoming light into parallel beams, an integrator lens that uniformizes intensity distribution of light radiated from the polarizer, and a diffusion lens with functions to enlarge or contract the irradiated range to the work size, and by forming protrusions and recesses of the shape, material, and size that fit to the desired wavelength on a substrate such as quartz, etc. that transmit ultraviolet light, and by providing the light-polarizing performance by appropriately providing an incident angle. By carrying out this processing, the alignment film in the liquid crystal display element can be photo-aligned at high accuracy and uniformly.

5 Claims, 6 Drawing Sheets

APPARATUS FOR OPTICALLY ARRANGING SURFACE OF ALIGNMENT FILM AND METHOD FOR MANUFACTURING LIQUID CRYSTAL DISPLAY DEVICE USING THE SAME

CROSS-REFERENCE TO RELATED APPLICATION

The present application claims priority from Japanese Patent Application No. JP 2004-116518 filed on Apr. 12, 2004, the content of which is hereby incorporated by reference into this application.

TECHNICAL FIELD OF THE INVENTION

The present invention relates to a method for manufacturing liquid crystal display element and an apparatus for optically arranging surface of alignment film, and in particular, to a technique of irradiating liquid crystal display element composing alignment film with polarized light and controlling liquid crystal alignment (photo-induced alignment technique).

BACKGROUND OF THE INVENTION

As a device to display various images including still images and moving pictures such as PC (personal computer), TV (TV receiver), and others, liquid crystal display devices are popularly used. This kind of liquid crystal display devices are classified into a system to compose a liquid crystal panel of a construction in which a liquid crystal layer is provided between two substrates, basically at least one of which is formed by transparent glass, polymerized film, etc., and carry out switching of the desired pixels (light-on and light-out) by selectively applying voltage to various electrodes for pixel formation formed on the substrate of the liquid crystal panel and a system to form the various electrodes and active elements for pixels selection and switch the desired pixels by selecting this active element. In particular, the liquid crystal display device of the latter system is called an active matrix type and is the mainstream liquid crystal display device because of good contrast performance, high-speed display performance, and others.

For conventional active matrix type display devices, there is a vertical-aligned liquid crystal display in which the electric field is applied across an electrode formed on one substrate and an electrode formed on the other substrate to change the liquid crystal display alignment. In addition, in recent years, a horizontal-aligned liquid crystal display called IPS (In-Plane Switching) has been materialized, in which the direction of electric field applied to the liquid crystal layer is brought nearly parallel to the substrate surface. For an example of this IPS liquid crystal display device, the device designed to obtain a remarkably wide viewing field angle is known by the use of a comb electrode for one of the two substrates (for example, see Japanese Patent Publication No. 63-21907 and U.S. Pat. No. 4,345,249 Specification).

On the other hand, the alignment film that aligns liquid crystal molecules that compose a liquid crystal layer has, in general, microscopic grooves formed in a specific direction by providing treatment called rubbing on the thin film surface such as polyimide-based resin, etc., and has a function to align liquid crystal molecules along these grooves. For the rubbing treatment, a method for forming the alignment film by rubbing the substrate surface with a cloth called rubbing cloth wrapped around a rotating roller has been achieved. In the rubbing process, dust, static electricity, scratches, etc. are generated, which cause a low yield for manufacturing the display and a degradation of display quality.

In particular, in recent years, liquid crystal TV receivers using liquid crystal display devices in place of Braun tube type TV receivers have been popularly utilized and high-quality liquid crystal panels are required. Therefore, in recent years, a technique to get liquid crystal alignment lined up without providing the rubbing treatment to the alignment film has been proposed.

Of the techniques to form the alignment film without providing the rubbing treatment, there is a method to use polarized light. This method is to irradiate a thin film, an alignment film, of polyimide-based resin, etc. with polarized light and to give rise to polarization or structural changes by photochemical reactions. Using optically aligning method, alignment of liquid crystal molecules on the thin film is lined up (this technique is hereinafter called "photo-alignment" technique).

In the photo-alignment method, for the polarized light to be irradiated, ultraviolet rays with high energy are popularly used. FIG. 4 is a drawing that indicates one example of configuration of an apparatus for optically arranging surface of alignment film in order to carry out photo alignment of the alignment film of liquid crystal display device by irradiating the thin film with polarized light, which the present inventors have examined as premises of the present invention. The apparatus for optically arranging surface of alignment film shown in FIG. 4 comprises a lamp (light source) 1, condenser mirror 2, collimator lens 3, polarizer (pile element) 12, integrator lens 6, diffusion lens 7, and others. The light that contains ultraviolet rays and is radiated from lamp 1 is converged at the condenser mirror 2 and is allowed to fall on the collimator lens 3. Parallel beam is formed at the collimator lens 3 and the parallel beam 4 is allowed to fall on the polarizer 12, and polarized light is obtained. And in order to uniformize polarized light distribution, the polarized light is allowed to fall on the integrator lens 6, and the work 100, a component part of liquid crystal display device, etc., is irradiated by the polarized light 9 that passed the diffusion lens 7.

In the above-mentioned photo-induced alignment, for a polarizer 12 to obtain polarized light, resin film with polarization performance, organic film with polarization film affixed to glass, those utilizing a special prism of double reflection, and others are used. In addition, in an apparatus for optically arranging surface of alignment film which comprises the lamp 1, condenser lens 2, and collimator lens 3 and irradiates objects with divergent beam, the polarizer 12 must be disposed in the position with small energy density, that is, the position where light does not condense. This is because the polarizer 12 is exposed to extremely strong light or ultraviolet ray and the polarizer 12 which uses organic film is excessively deteriorated by strong light and ultraviolet ray, and is practically unable to be used at the light converging position.

In addition, even in the event that the polarizer 12 is installed in the region with weak energy density, the organic film is degraded with time against ultraviolet ray, and causes a problem that the polarizer is not applicable for practical use.

On the other hand, the polarizer that uses a prism of double reflection provides resistance to ultraviolet ray but has problems such as inability to be upsized, large incident angle dependence, and others, and is difficult to apply to an exposure apparatus such as an apparatus for optically arranging surface of alignment film.

As described above, there are problems, respectively to apply conventional polarizer to photo-induced alignment of liquid crystal display devices. As against this, polarizer utilizing the Brewster angle (for example, see Japanese Patent Application Laid-Open Publication No. 10-90684) and polarizer using multi-layer films (optical interference films) (for example, see Japanese Patent Application Laid-Open Publication No. 10-332932) are proposed. In the polarizer using the Brewster angle, multiple pieces of glass plates disposed in parallel with spaces are arranged to be inclined to the optical axis by the Brewster angle only. In addition, the polarizer using multi-layer films is a filter with the multilayer film formed on the substrate to polarize the light of a specific wavelength region.

SUMMARY OF THE INVENTION

Now, as a result of the investigation made by the present inventors on the above-mentioned photo-induced alignment techniques, the following have been clarified.

For example, the polarizer as described above has the incident angle dependence. Consequently, in the apparatus for optically arranging surface of alignment film using the above-mentioned polarizer, as shown in FIG. 4, the outgoing beam (parallel bean 4) of the collimator lens 3 or collimator mirror must be allowed to fall on the polarizer 12 and the work 100 must be irradiated by the polarized beam.

However, because in the apparatus for optically arranging surface of alignment film in the liquid crystal display device, a large irradiation region is required and on the outgoing side of the collimator lens 3 or collimator mirror, luminous flux is expanded, in order to obtain the polarized light with a high polarized ratio throughout the whole irradiated region, a huge polarizer 12 is required. This polarizer is difficult to be fabricated because of the limitation in size of the evaporation apparatus when the optical interference film is used.

The polarizer using the Brewster angle has glass plates 13 arranged to be inclined by Brewster angle only with respect to the optical axis as shown in FIG. 4. The Brewster angle to the beam of necessary wavelength is formed, s-polarized light is reflected and p-polarized light is transmitted. This penetrated p-polarized light is utilized as the polarized light.

However, only low polarized separate efficiency is obtained only with one piece of glass plate 13 (small polarized ratio). Therefore, as the polarizer 12 of FIG. 4 indicates, in order to increase the extinction ratio, in general, a plurality of glass sheets 13 are disposed in parallel with a space left. In the event that a polarizer 12 is formed by the use of a plurality of glass plates 13 as described above (hereinafter called the "pile element"), the following problems are generated.

That is, the s-polarized light components reflected by places other than the surface of the first glass plate 13 on the incoming light side (rear surface reflection of the first glass plate, surface reflection of the second glass plate, etc.) are multi-reflected by the surfaces and rear surfaces of other glass plates 13 and become stray beams and may pass the pile element 12, though in a small amount. Consequently, in the case of the pile element 12 utilizing the Brewster angle, the extinction ratio does not increase proportionally even when the number of glass plates 13 is increased.

In addition, further increasing the number of glass plates 13 in order to increase the extinction ratio increases the deviation rate of optical axis to the light passing the pile element 12 and it becomes difficult to design or adjust the optical system.

Furthermore, when the number of glass plates 13 increases, the size of the pile element 12 increases and the size of the apparatus for optically arranging surface of alignment film increases, too.

In addition, when the number of glass plate 13 increases, the number of glass substrates through which light passes increases, and therefore, the amount of transmitted light decreases, and the amount of light irradiated on work 100 decreases (large light loss).

Consequently, in order to obtain the irradiation energy necessary for photo-induced alignment, the output of light source (lamp 1) must be greatly increased or irradiated beams must be converged, and increased apparatus cost and reduced irradiation region, or increased irradiation time due to small energy cause problems of reduced throughputs of photo-aligned process.

Therefore, it is an object of the present invention to provide a technique to efficiently separate polarized light of a desired wavelength from non-polarized light in the photo-aligned process in liquid crystal display elements.

The above-mentioned and other objects and new features of the present invention will be clarified from the description of the present specification and attached drawings.

Of the inventions disclosed in the application concerned, the outline of a typical one can be briefly described as follows.

That is, in the method of manufacturing the liquid crystal display element and the apparatus for optically arranging surface of alignment film according to the present invention, grating is utilized as a polarizer. In this polarizer, grating is used to separate polarized light from non-polarized light and the polarizer has protrusions and recesses of the material that fits to the desired wavelength ($SiO_2$: silicon dioxide; $CaF_2$: calcium fluoride; $MgF_2$: magnesium fluoride, etc.), shape (quadrangle, triangle, circle, etc.), and size (height, width, length, intervals, etc.) formed on a substrate such as silica glass, etc. that transmit ultraviolet light, and by appropriately providing an incident angle, the polarizer provides the light-polarizing performance.

In addition, the apparatus for optically arranging surface of alignment film according to the present invention comprises the polarizer using grating to separate polarized light from non-polarized light, light source and condenser mirror to allow light to fall on the polarizer, collimator lens or collimator mirror to make incoming beams become parallel beams, and integrator lens that uniformizes the intensity distribution of outgoing light from the polarizer.

By using grating for the polarizer, it is possible to efficiently separate the polarized light of the desired wavelength from non-polarized light. In addition, by using the grating for the apparatus for optically arranging surface of alignment film, it is possible to downsize the polarized light forming section and furthermore, to provide the grating with the polarizer function at an irradiation energy loss (light loss) smaller than that of the method using the Brewster angle. Furthermore, by using the grating, it is possible to uniformly irradiate the whole light-irradiated region with the polarized light necessary for photo-induced alignment.

By the way, non-polarized light means the light that is mixed with polarized lights with various vibration directions and the light that does not exhibit anisotropy.

The effects obtained in the present invention is briefly described as follows.

By using the grating as a polarizer, it is possible to separate polarized light of a desired wavelength at high efficiency.

BRIEF DESCRIPTIONS OF THE DRAWINGS

These and other features, objects and advantages of the present invention will become more apparent from the following description when taken in conjunction with the accompanying drawings wherein.

DESCRIPTION OF THE PREFER EMBODIMENTS

Figure 1:
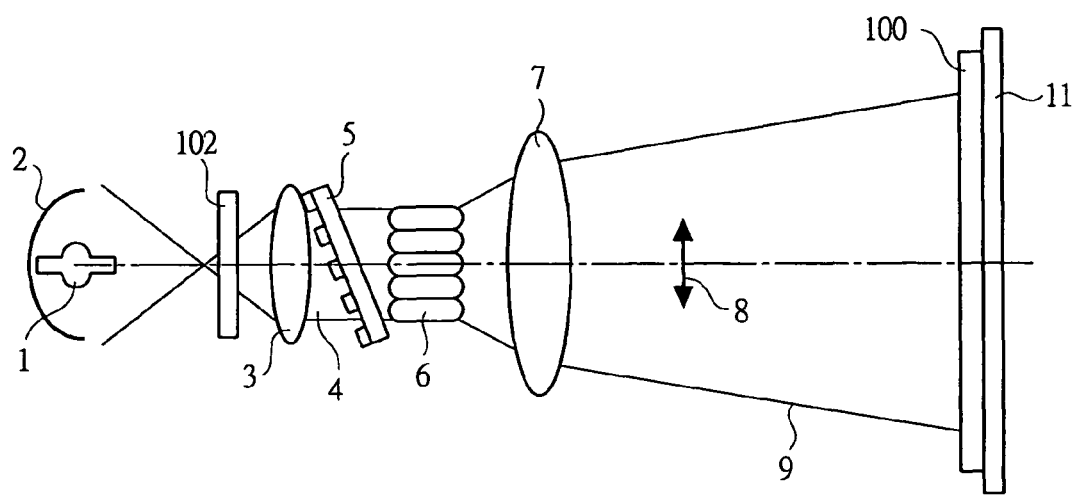
FIG. 1 illustrates configuration of an apparatus for optically arranging surface of alignment film according to the one embodiment of the present invention.

Referring now to the drawings, embodiments of the present invention will be described in detail hereinafter. By the way, like reference characters are assigned to like or corresponding members throughout all the drawings to explain the embodiments, and the repeated description is omitted.

FIG. 1 generally illustrates configuration of an apparatus for optically arranging surface of alignment film according to one embodiment of the present invention.

First of all, based on FIG. 1, one example of the apparatus for optically arranging surface of alignment film of the present embodiment is described. The apparatus for optically arranging surface of alignment film of the present embodiment is used for photo-aligned process, for example, in a liquid crystal display element, and comprises a lamp 1, condenser mirror 2, collimator lens 3, polarizer 5, integrator lens 6, diffusion lens 7, shutter 102, and others.

In FIG. 1, the lamp (light source) 1 is a Xe—Hg lamp, etc. that generates at least wavelength of the ultraviolet region in order to carry out photo-induced alignment. The light radiated from the lamp 1 is converged by the condenser mirror 2, passes the collimator lens 3, and becomes parallel beam 4. On the polarizer 5 that forms grating on a substrate such as $SiO_2$, parallel beam 4 falls and polarized light is generated.

In the polarizer 5, the polarized ratio of the desired polarized light 9 is determined by the incident angle, so that the parallel beam 4 is generated by the collimator lens 3 such that the whole irradiation range is irradiated at a certain angle and smaller by the polarizer 5 (angle in which the polarized ratio is included in a specified range). In FIG. 1, by using the collimator lens 3, the parallel beam 4 is generated. However as the beam 4 depends on the arrangement of the optical system, the collimator lens 3 may be changed to a collimator mirror and the light path is turned to obtain the parallel beam 4.

The polarized light generated by the polarizer 5 is allowed to fall on the integrator lens 6 in order to uniformize the light intensity distribution of the light-irradiated region. For the integrator lens 6, for example, fly-eye lens, etc. are used. In such event, the integrator lens 6 is fabricated by thin-film etching from the quartz ($SiO_2$) material or desirably fabricated by optical contact. In addition, since the commercially available adhesives and sealing agents are susceptible to ultraviolet light, irregular illuminance may occur due to changes with time when any bonded portion is present or the optical axis deviation may be generated. It is therefore requested to avoid commercially available adhesives and sealing agents.

The radiated light whose distribution is uniformized by the integrator lens 6 becomes the polarized light 9 diffused by the diffusion lens 7 for diffusing the light into the desired irradiated region, and the work 100 installed on a stage 11 is irradiated with the polarized light 9. The stage 11 has a moving mechanism in the XY plane direction perpendicular to the optical axis and a θ-rotating mechanism in the plane perpendicular to the optical axis so that the optical axis can be adjusted to the polarized light axis 8 of the polarized light 9 generated.

The diffusion lens 7 is a lens that has a function to enlarge or contract the irradiated range to the size of work 100. In addition, work 100 is a component part of the liquid crystal display device, a substrate on which a thin film that serves as an alignment film is formed.

The light that has passed the polarizer 5 becomes the polarized light 9 (hereinafter called the "TM polarization") whose electric field is perpendicular to grooves by the grating of the polarizer 5 and alignment control is carried out on work 100 by photo-chemical reaction.

The shutter 102 is a device to turn ON/OFF the light.

Next discussion will be made on the polarizer 5, which generates the TM polarization 9.

Figure 2:
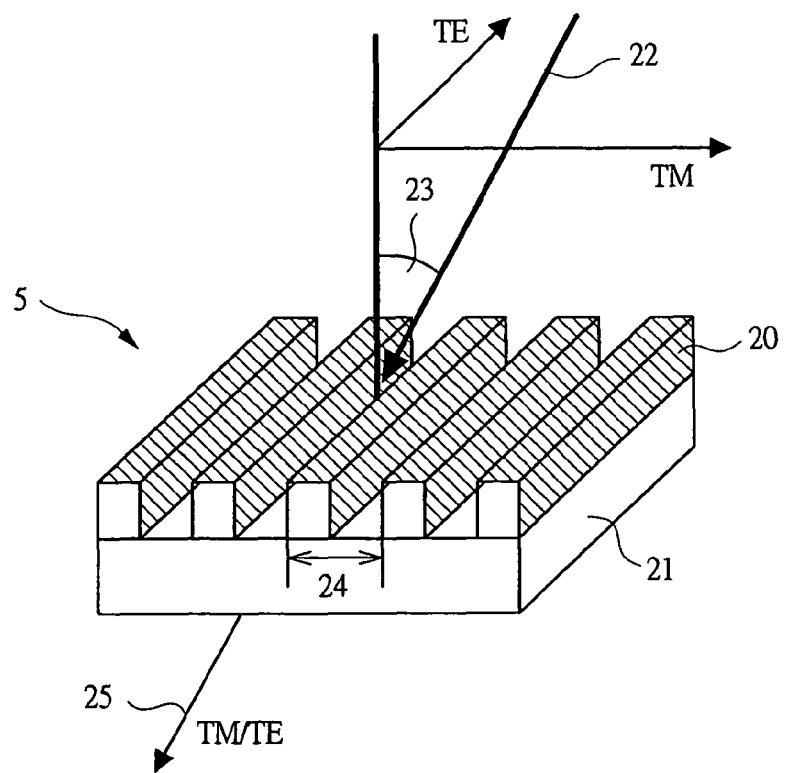
FIG. 2 illustrates configuration of a polarizer that generates polarized light for photo-induced alignment according to the one embodiment of the present invention.

FIG. 2 illustrates general configuration of a polarizer 5 that generates polarized light for photo-induced alignment in the present embodiment. The polarizer 5 in the present embodiment comprises a substrate 21, grating 20 formed on the substrate 21, and others. Because light of the ultraviolet region is used for photo-alignment reactions, a quartz ($SiO_2$) substrate is used for the substrate 21 to form the grating 20.

The incident angle 23 to the grating 20 is decided according to the wavelength of incident light 22 that generates polarized light and the polarizer 5 is installed at an angle of the incident angle 23 to the optical axis in the apparatus for optically arranging surface of alignment film shown in FIG. 1. This polarizer 5 is fabricated by finding the grating 20 material ($SiO_2$: silicon dioxide; $CaF_2$: calcium fluoride; $MgF_2$: magnesium fluoride, etc.), shape (quadrangle, triangle, circle, etc.), and size (height, width, length, intervals, etc.), and incident angle 23 so that the extinction ratio (TM/TE) of the polarization whose electric field is perpendicular to grooves (TM polarization) to that of the polarization whose electric field is parallel to grooves (TE polarization) is maximized.

Figure 3:
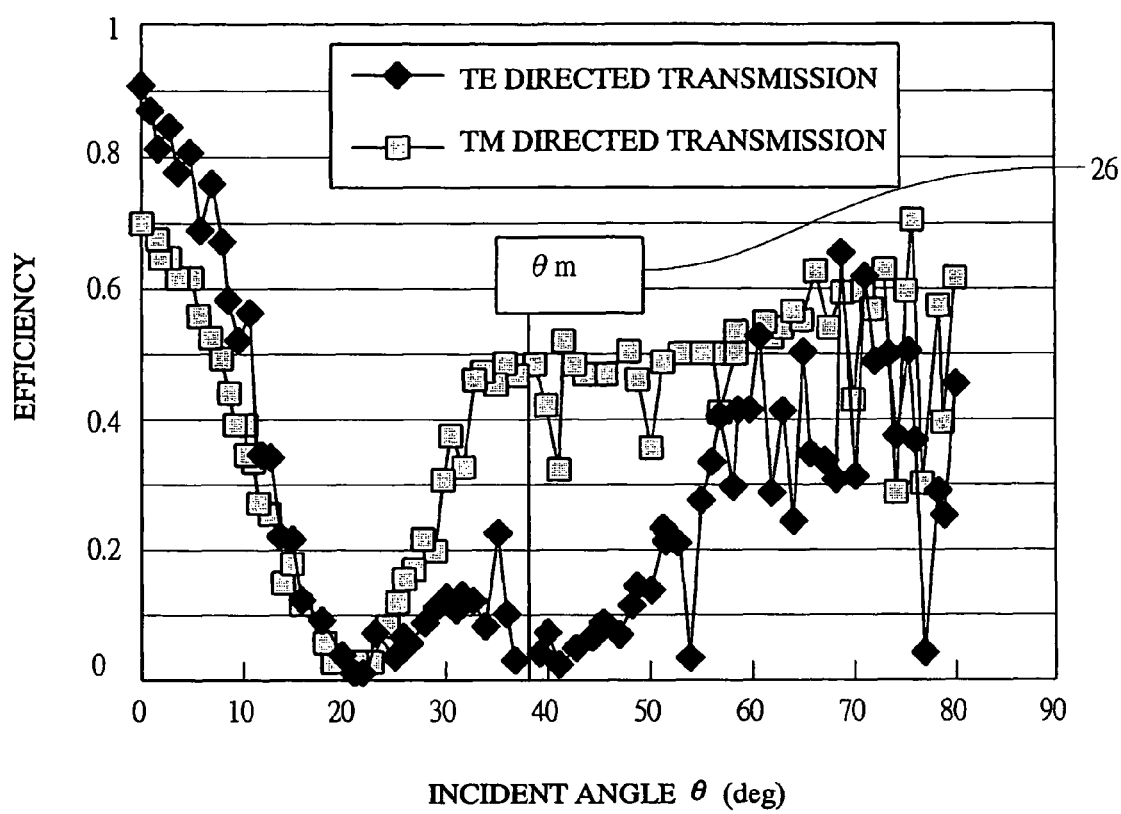
FIG. 3 illustrates the changes of polarized light intensity to the incident angle of the polarizer according to the one embodiment of the present invention.
Figure 4:
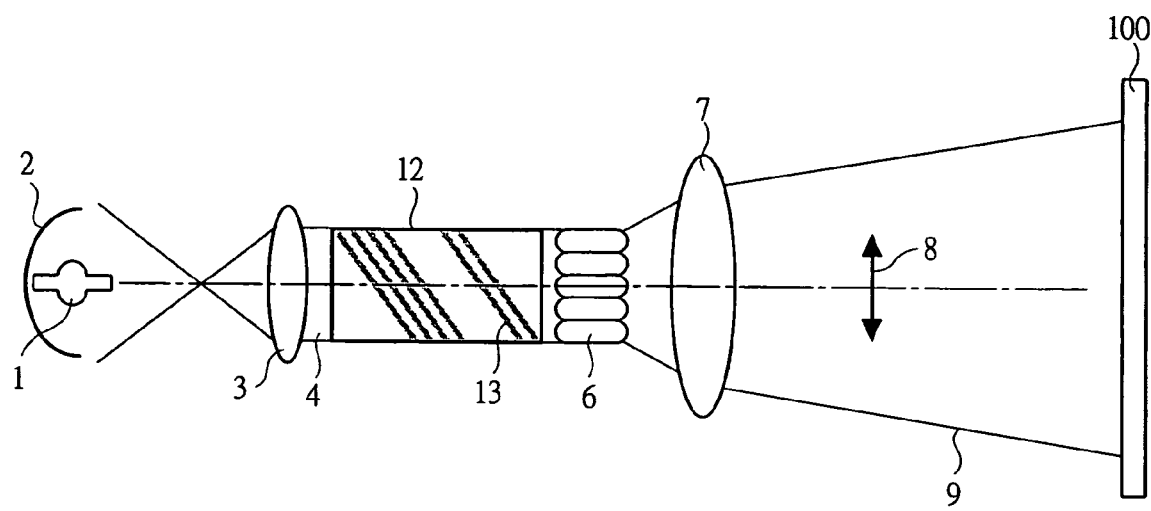
FIG. 4 illustrates configuration of an apparatus for optically arranging surface of alignment film examined as premises of the present invention.

FIG. 3 illustrates one example of polarized light generated by the use of the polarizer 5, which has the grating 20. FIG. 3 illustrates the changes of polarized light intensity to the incident angle (θ) 23. At the position of the maximum angle at extinction ratio (θm) 26, the maximum ratio of the transmitted light of TE polarization to TM polarization is reached, and polarized light in the TM direction is obtained. In such event, it becomes essential to form the grating 20 in such a manner that the extinction ratio is not varied around the maximum angle at extinction ratio (θm) 26.

Similarly, the extinction ratio of TE polarization to TM polarization with respect to wavelength is taken into account, and it becomes possible to stably generate polarized light of wavelength (single wavelength) or wavelength region (optional region) necessary for photo-induced alignment.

Figure 5:
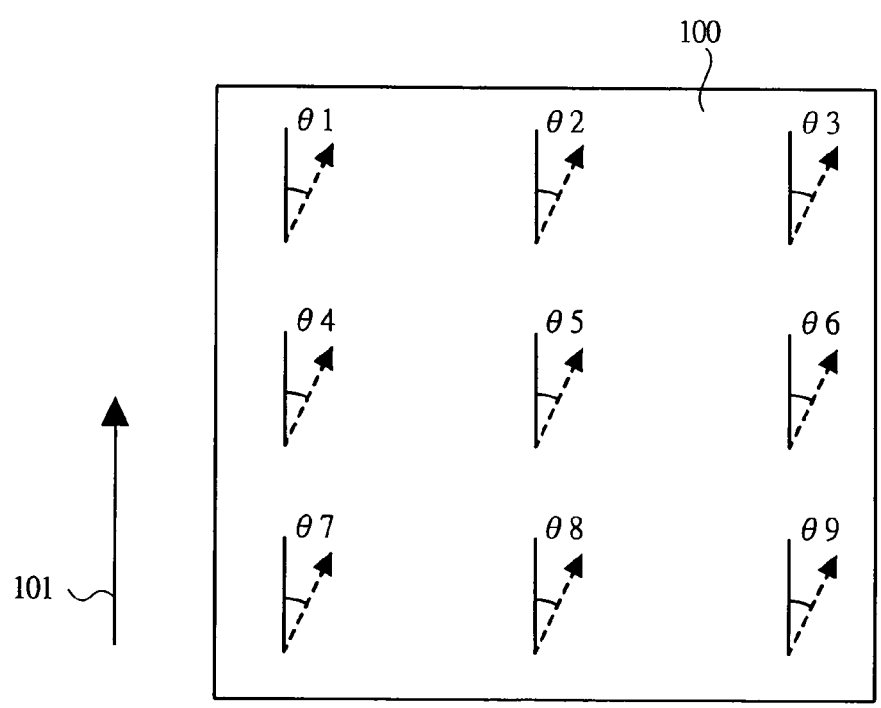
FIG. 5 is a plan view of work according to one embodiment of the present invention viewed from the optical axis direction.

FIG. 5 is a plan view of work 100 from the optical axis direction (light irradiating direction). The TM polarization 9 applied to work 100 has the deviation (for example, θ1-θ9 in FIG. 5) in the alignment direction of each position (9 positions in FIG. 5) included within a specified value so that no change is generated in brightness and chromaticity. The polarized light axis, distribution, and polarized light intensity of the TM polarization 9 irradiated to each position are desirably controlled periodically by the polarized axis monitor, etc. The number of measurements is not limited to 9 places but may be any number of places.

Figure 6:
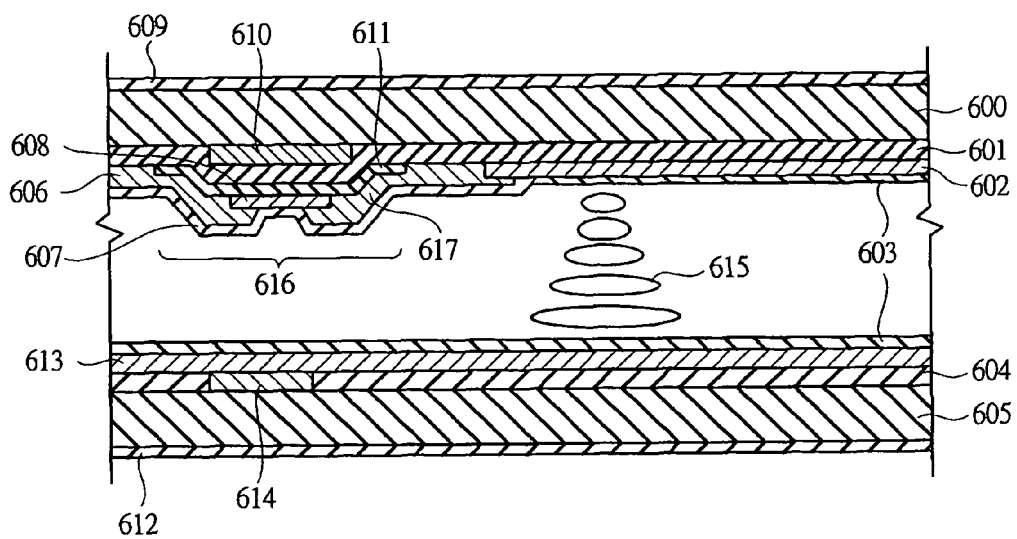
FIG. 6 is a cross-sectional view that illustrates configuration of a liquid crystal display element according to one embodiment of the present invention.
Figure 7:
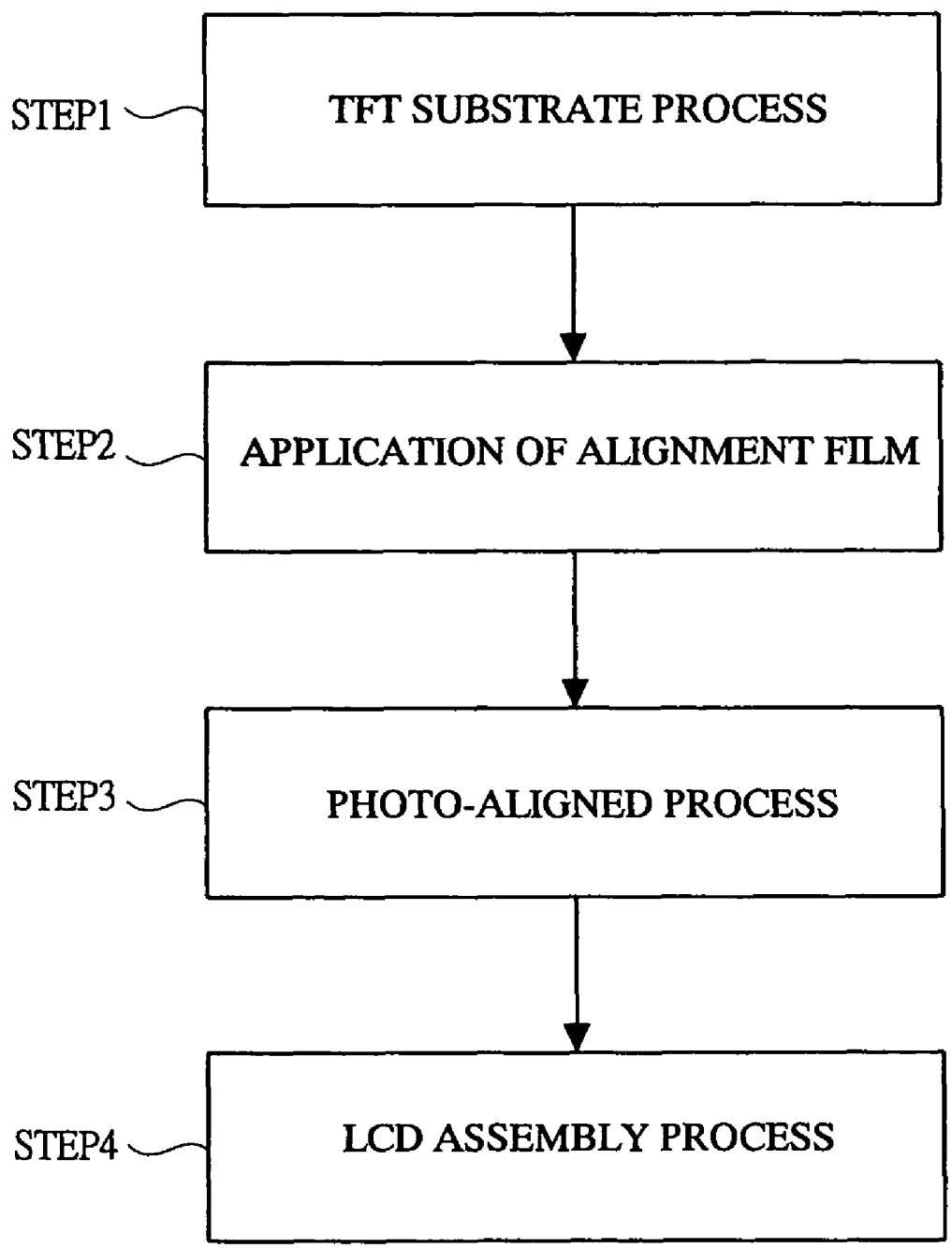
FIG. 7 is a flow chart that illustrates a manufacturing process of a liquid crystal display element according to one embodiment of the present invention.

Referring now to FIG. 6 and FIG. 7, a manufacturing method of a liquid crystal display element using the apparatus for optically arranging surface of alignment film according to the present embodiment will be described. FIG. 6 explains the unit pixel portion of TFT substrate in which liquid crystal alignment control function is added to the alignment film by the photo-alignment method according to the present embodiment. In addition, FIG. 7 illustrates a manufacturing process of a liquid crystal panel.

In the present embodiment, explanation will be made with a liquid crystal display device of an active matrix type TN (twisted nematic) mode taken for an example.

As shown in FIG. 6, as a substrate that composes a liquid crystal panel, for example, two transparent glass substrates 600, 605, for example, 0.5 mm and 730 mm×920 mm in size are used, and on one glass substrate 600, a thin-film transistor (hereinafter called "TFT") is formed (TFT portion 616) on which silicon nitride films (insulator 601, protection film 607) are formed as insulator. Further on the insulator, polyimide based alignment film 603 is formed to produce a TFT substrate.

On the other glass substrate 605, a color filter 604 and black matrix 614 are formed, on which an ITO film 613, a transparent conductive electrode, is formed. Further on the ITO film, alignment film 603 is formed. Between the two glass substrates 600, 605, that is, between alignment films 603, liquid crystal (liquid crystal molecules 615) is enclosed. In addition, on the outside the two glass substrates 600, 605, polarization plates 609, 612 are attached.

First of all, in the TFT substrate process of STEP 1 in FIG. 1, a thin-film transistor TFT which is a liquid crystal switching element is formed (TFT portion 616).

Now, explanation will be made on the glass substrate 600 to which the TFT switching element is mounted. The TFT portion 616 comprises a pixel electrode (source electrode) 617, signal electrode (drain electrode) 606, scanning electrode (gate electrode) 610, and amorphous silicon film (a-Si) 608 that is an active layer. The scanning electrode 610 and common electrode (not illustrated) as well as signal electrode 606 and pixel electrode 617 are formed using the same process of patterning the same metal film layer. Furthermore, the pixel electrode 617 is connected to the ITO film 602, which is a transparent conductive electrode. Between the scanning electrode 610 and the amorphous silicon film 608, insulator 601 is formed with SiN (silicon nitride).

In STEP 2 of application of alignment film, the alignment film 603 to arrange liquid crystals is applied by spin coater or printing system. In the present embodiment, for the alignment film 603, polyimide based material was adopted.

In STEP 3 of the photo-aligned process, the alignment film 603 applied in STEP 2 is irradiated with polarized ultraviolet light using the apparatus for optically arranging surface of alignment film shown in FIG. 1. For the light source (lamp 1), a Xe—Hg lamp, etc. are used, the desired ultraviolet light only is taken out as the TM polarization 9, and alignment control is carried out on the alignment film 603.

In the irradiation of TM polarization 9, the photo-aligned process is carried out by collective irradiation of the whole surface of work 100 shown in FIG. 5. The polarization axis and the polarized light intensity should be controlled on the irradiated surface of work 100. The photo-aligned process shall be carried out on the alignment film 603 on the TFT side (glass substrate 600) and on the color filter side (glass substrate 605).

As shown in FIG. 6, on the other glass substrate 605, color filter 604 with R (red), G (green), and B (blue) colored layers for each pixel are provided.

After STEP 3 of the photo-aligned process, in STEP 4 of the liquid crystal display assembly process, between photo-aligned glass substrates 600 and 605, liquid crystal (liquid crystal molecules 615) is enclosed. The interval between the two glass substrates 600 and 605 is kept constant by using spacers and the distribution rate of the liquid crystal molecule 615 is intended to be kept constant. Thereafter, a peripheral circuit to drive the liquid crystal display is mounted and a liquid crystal panel is completed.

Because the photo-aligned process by the present embodiment can utilize irradiating energy at high efficiency as compared to the conventional apparatus for optically arranging surface of alignment film by pile elements, polarized light irradiating time for photo-aligned process is reduced and the productivity is improved.

In addition, the active matrix type liquid crystal panel obtained in this way can achieve image display with satisfactory display uniformity.

Figure 8:
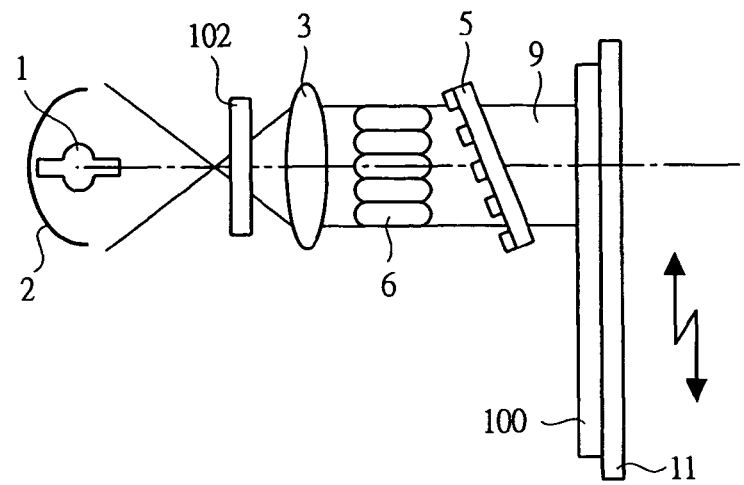
FIG. 8 illustrates configuration of a polarizer that generates polarized light for photo-induced alignment according to another embodiment of the present invention.
Figure 9:
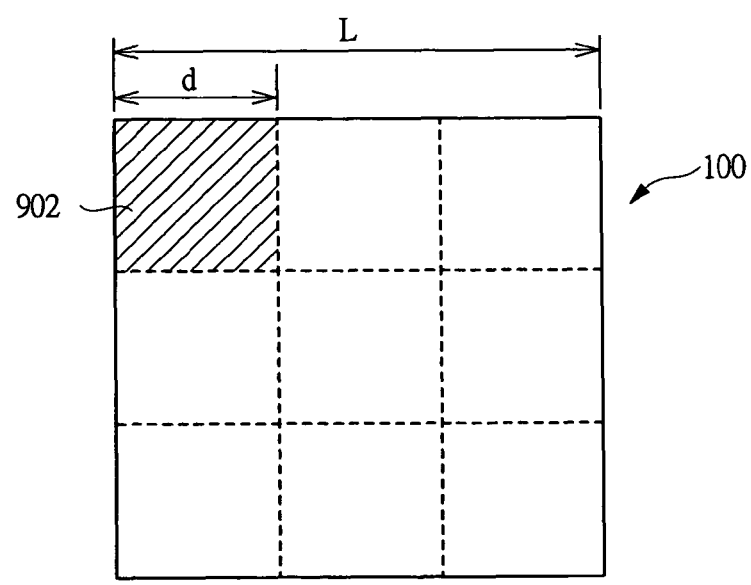
FIG. 9 is a plan view of work step-irradiated by the apparatus for optically arranging surface of alignment film of FIG. 8.

Referring now to FIG. 8 and FIG. 9, the liquid crystal display element manufacturing method by other embodiment will be described. The manufacturing method of the liquid crystal display element in the present embodiment is same as the apparatus for optically arranging surface of alignment film and method for manufacturing liquid crystal display device by the above-mentioned embodiment shown in FIG. 1 except for the following points.

That is, in the present embodiment, the diffusion lens 7 is omitted, the irradiated region of TM polarization 9 is narrowed, and the energy density is improved (step irradiation system). FIG. 8 is a schematic representation of the step irradiation system. The TM polarization 9 that passes the polarizer 5 and is generated is not converted to diffused light by the diffusion lens 7 and the work 100 is irradiated with the TM polarization as it is. By this, the irradiated energy density increases, and the irradiation time for photo-aligned process is shortened. In step irradiation, for example, in the event that a substrate in the length of substrate size L as shown in FIG. 9 is divided into 9 equal parts, the divided irradiated region 902 is irradiated in the length d. The stage 11 is moved two-dimensionally in XY directions and perpendicularly to the optical axis, and successively photo-aligns the whole substrate.

Because there is no need to diffuse the polarized light to the substrate size L in this method, the irradiation energy density can be increased. In addition, because the light path length for diffusion is not required, the apparatus for optically arranging surface of alignment film can be downsized.

When the irradiated place is shifted or the substrate is replaced, the light is turned ON/OFF by the shutter 102. In addition, the substrate should not be limited to 9 divisions but can be divided in any number of portions.

As described above, the invention achieved by the present inventors has been specifically described on the basis of the embodiments, but the present invention shall not be limited to the above-mentioned embodiments and needless to say, many modifications can be made without departing from the spirit and the scope of the invention as hereinafter claimed.

For example, in the above-mentioned embodiments, a twisted nematic mode liquid crystal display device was discussed, but the present system shall not be limited to this but can be applied to In-Plane Switching (IPS), too.

As described above, according to the present invention, by the apparatus for optically arranging surface of alignment film that can form polarized light of the desired waveform at high efficiency, it is possible to add liquid crystal alignment control function of high accuracy and high uniformity and free of defect to the alignment film for large-screen liquid crystal display devices such as TVs, etc., for which particularly high quality is required, and it is possible to provide a method and apparatus for optically arranging surface of alignment film by obtaining liquid crystal display devices by enabling high-reliability and high-quality image display.

While we have shown and described several embodiments in accordance with our invention, it should be understood that disclosed embodiments are susceptible of changes and modifications without departing from the scope of the invention. Therefore, we do not intend to be bound by he details shown and described herein but intend to cover all such changes and modifications and fall within the ambit of the appended claims.

What is claimed is:

1. A method for manufacturing liquid crystal display elements comprising the steps of:

forming polarized light from non-polarized light by the use of a polarizer having a grating and an integrator lens;

uniformizing a polarization axis of the polarized light with respect to an irradiation region by adjusting an incident angle of the non-polarized light to the grating by the use of the polarized light obtained at a plurality of measurement positions through a polarization axis monitor;

uniformizing an intensity of the polarized light irradiated from the integrator lens with respect to the irradiation region by adjusting an optical axis of the integrator lens using the intensity of the polarized light obtained at a plurality of measurement positions through the polarization axis monitor; and collectively irradiating an alignment film with the polarized light having the uniformized polarization axis and light intensity, thereby aligning the alignment film.

2. The method for manufacturing liquid crystal display element according to claim 1, wherein the grating is formed on a substrate that transmits ultraviolet light and is formed by the material, shape, and size that all fit to the desired wavelength of the polarized light.

3. The method for manufacturing liquid crystal display element according to claim 2, wherein the substrate that transmits ultraviolet light is made of silica glass.

4. The method for manufacturing liquid crystal display element according to claim 2, wherein the materials of the grating are silicon dioxide ($SiO_2$), calcium fluoride (CaF), or magnesium fluoride (MgF).

5. The method for manufacturing liquid crystal display elements according to claim 1, wherein the polarized light is repetitively irradiated on a region adjacent to the area where the polarized light having the uniformed polarization axis and poliarized light intensity has been radiated.

* * * * *